(12) United States Patent
Brannan et al.

(10) Patent No.: US 6,576,841 B1
(45) Date of Patent: Jun. 10, 2003

(54) CABLE SEALING COVER INCLUDING STRESS RELIEF

(75) Inventors: Dennis G. Brannan, Dripping Springs, TX (US); Jacqueline A. Campbell, Austin, TX (US); Christopher J. Evoniuk, Austin, TX (US); Donald R. Gilde, Spicewood, TX (US); Ernest A. Hopcus, Austin, TX (US)

(73) Assignee: Office of Intellectual Property Counsel 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/106,266

(22) Filed: Mar. 26, 2002

(51) Int. Cl.⁷ .................................................. H01R 4/22
(52) U.S. Cl. .................................................... 174/74 A
(58) Field of Search ........................... 174/74 A, 77 R, 174/82, 93

(56) References Cited

U.S. PATENT DOCUMENTS

| | | | |
|---|---|---|---|
| 3,515,798 A | | 6/1970 | Sievert |
| 3,808,352 A | | 4/1974 | Johnson |
| 4,217,465 A | * | 8/1980 | Holden ................... 174/138 F |
| 4,389,440 A | | 6/1983 | Keith |
| 4,467,002 A | * | 8/1984 | Crofts ......................... 138/103 |
| 4,517,407 A | | 5/1985 | Fox et al. |
| 4,822,956 A | * | 4/1989 | Sepe ........................... 174/103 |
| 5,028,656 A | * | 7/1991 | Okabe et al. ................ 524/540 |
| 5,080,942 A | | 1/1992 | Yau |
| 5,149,916 A | * | 9/1992 | Baker et al. .............. 174/74 A |
| 5,767,448 A | * | 6/1998 | Dong ........................ 174/74 A |

\* cited by examiner

Primary Examiner—Chau N. Nguyen
(74) Attorney, Agent, or Firm—Alan Ball

(57) ABSTRACT

A molded article for protecting a transition section of a multi-wire cable. The article includes a transition cover having an elastomeric skin and further including a cable receiving tube, having an open channel therein. The cable receiving tube has intersection with each of a plurality of wire cover sleeves to provide passage openings from the open channel of the cable receiving tube to each of the plurality of wire cover sleeves for insertion of at least one wire of the multi-wire cable therein. A stress relief pocket formed in the elastomeric skin, adjacent to at least a portion of each intersection, extends towards the open channel and includes at least one crease to accommodate expansion of the stress relief pocket from a partially folded condition to reduce the concentration of stress at an intersection during movement of the transition cover from a relaxed condition to a stretched condition.

15 Claims, 2 Drawing Sheets

CABLE SEALING COVER INCLUDING STRESS RELIEF

FIELD OF THE INVENTION

The invention relates to electrical wiring, and optical fiber transmission structures, represented by wiring harnesses, and fiber-optic networks and the like, which include transition sections produced by diverting signal carriers from a multi-wire or multi-fiber cable into connecting branches required by the signal carrier network design. More particularly the present invention provides a protective, sealing, cable transition cover including stress-relief to accommodate repeated flexing and related distortion of branched-signal carrier transition sections during manufacture and installation of signal and electrical power carrying structures.

BACKGROUND OF THE INVENTION

The development of grids for electrical power distribution and communications networks relies upon cable-based signal and power carriers that reside inside protective jackets, isolated from deleterious environments. Protective outer jacket materials for conventional cables typically exhibit low surface energy. Suitable jacket polymers include, by way of example, polyethylene, polypropylene, or copolymers or blends thereof. A low surface energy outer jacket represents a barrier to contact of signal carriers with damaging components in an external environment that could compromise the function of the signal carrying elements.

A current carrying wire or a signal carrying optical fiber may become exposed to the environment in several different ways. In one common situation a cable, containing multiple signal carriers, may be damaged by abrasive wear, which progresses through a cable cover until signal carriers become exposed. A second situation, causing signal carrier exposure, is the linking of cables and joining of signal carriers during the construction of electricity distribution grids or communications networks. This construction activity produces multiple spliced cable sections that require application of protective covers to replace the cable jacket and re-seal the signal and power carriers from the environment. Without suitable protection, cable operation and life expectancy may be adversely affected.

A variety of closures exist for protecting cables that include either spliced sections or worn portions showing evidence of jacket deterioration. Closures take the form of covers or housings for placing over portions of a cable in locations of exposed signal or power carrier elements. A closure, placed around a spliced or worn section of a cable, may be applied using a known process for shrinking a covering or housing against the outer surface of the section requiring protection. U.S. Pat. Nos. 5,080,942 and 4,389,440 describe pre-stretched shrinkable covers used as protective cable closures.

Pre-stretched shrinkable covers, also known as cold-shrink covers or tubes or prestretched tubes (PST), were developed to overcome some of the disadvantages of heat shrink products. Heat-shrink products, while providing effective sealing and protection, approach a condition requiring material flow during recovery of the product to conform to the contours of a cable or cable splice surface. During recovery, a heat shrink cover changes its shape and cannot retain molded features that might be useful during the lifetime of the protected cable section. For example, a heat shrink cover preferably seats snugly around the cable section providing little protection against fatigue during repeated flexing of a splice junction. As a result, the intersection of a main cable and a branch wire represents a point of weakness, which could rupture under stress. The same is true for conventional cold-shrink covers designed without consideration of molded features for stress relief. Consequently, there is a need for sealed cable closures having less susceptibility to rupture under stress. Such closures would extend the duration of protection of cable splices or worn sections of cable as well as being resistant to damage by rough handling during the process of installation.

SUMMARY OF THE INVENTION

The present invention provides a protective, sealing, preferably elastomeric cable transition cover including stress-relief for application to wiring harnesses and the like. A cable transition cover according to the present invention accommodates repeated flexing and related distortion during manufacture, installation and subsequent use of wiring structures, which include transition sections produced by diverting wires from a multi-wire cable into connecting branches required by the wiring structure design.

Incorporation of stress relief, into a cable transition cover, allows an increased amount of stretching to place the elastomeric cable covers in a pre-stretched condition thereby facilitating wire insertion. Retention of cable covers in a stretched condition is possible with collapsible, disposable cores that are commonly used in pre-stretched tubing (PST) products, also known as cold shrink products, that find use in electrical cabling applications. Application of stress relief to cable transition covers facilitates core loading without rupture of the elastomeric cover. Being less susceptible to rupture, cable transition covers according to the present invention offer increased versatility and application of pre-stretched structures to a broader range of applications.

One improvement of incorporating stress relief is the manufacture of cable covers having more complex designs for increasing numbers of branches from a primary cable. This improvement also translates into relatively low profile transition covers sized to pass through smaller dimension through-holes formed in walls or bulkheads through which a cable transition section may pass. Size reduction leads to efficient space utilization and design flexibility during integration of wiring structure and vehicle or equipment design.

More particularly the present invention provides a molded article for protecting a transition section of a multi-wire cable. The article comprises a transition cover having an elastomeric skin and further comprising a cable receiving tube, having an open channel therein. The cable receiving tube has intersection with each of a plurality of wire cover sleeves to provide passages opening from the open channel of the cable receiving tube to each of the plurality of wire cover sleeves for insertion of at least one wire of the multi-wire cable therein. A stress relief pocket formed in the elastomeric skin, adjacent to at least a portion of each intersection, extends towards the open channel and includes at least one crease to accommodate expansion of the stress relief pocket from a partially folded condition to reduce the concentration of stress at an intersection during movement of the transition cover from a relaxed condition to a stretched condition.

Definitions

The term "cable transition cover" refers to an article applied around a section of cable to protect an underlying cable splice or worn section of cable jacket. A cable transition cover, supplied preferably in a pre-stretched condition, may be installed by shrinking it around the cable upon removal of one or more support cores commonly used in PST products. Cable transition covers according to the present invention include a cable receiving tube attached to one or more wire cover sleeves used to accommodate branch wires or fibers divided out from multiple signal or power carriers included in the main cable.

As used herein the term "wire cover sleeve" refers to that portion of a cable transition cover that contains and seals a branch wire or fiber extending from the main cable.

An "elastomeric skin" according to the present invention is the layer of elastomeric, recoverable material used to form a cable transition cover.

Terms including "stress relief pocket" or "fold" or "dish" or "cup" or similar terms may be used interchangeably herein to describe the portion of a cable transition cover according to the present invention that provides relief from stress associated with repeated flexure or severe bending of one or more wire cover sleeves relative to a cable receiving tube. A stress relief pocket may include one or more creases or partial folds, which open to relieve applied stress. Such creases or folds are generally difficult to incorporate into molded elastomeric structures.

Terms such as "protecting" and "protective" and the like, as applied to cable transition covers, refer to the ability of such covers to seal out moisture and contaminants from the vicinity of signal carrying wires and optical fibers.

A "transition section" is that portion of a cable containing a splice or one or more branched signal carriers that require protection following cable modification.

The term "multi-wire cable" is descriptive of an electrical or communications cable that contains a plurality of signal or power carriers, some of which may be separated to produce branched wiring structures.

The term "stress" refers to mechanical stress produced by flexure or similar displacement of an article described herein.

BRIEF DESCRIPTION OF THE DRAWINGS

Notwithstanding any other forms, which may fall within the scope or the present invention, preferred forms of the invention will now be described, by way of example only, with reference to the accompanying drawings in which.

DETAILED DESCRIPTION OF THE PREFERRED EMBODIMENTS

Articles according to the present invention comprise a transition cover molded from an elastomer by compression, transfer or injection molding with or without visible parting lines. The molded cover is substantially hollow so that when applied to the transition section of an electrical cable structure the cover provides a protective skin having the cable and wires of the transition section sealed inside it to prevent ingress of moisture and contaminants. The skin or wall, of elastomeric molded transition covers according to the present invention, includes an area of stress relief referred to herein as a stress relief pocket or fold or the like, as previously defined. The stress relief pocket may include creases or folds as needed to reduce the concentration of stress at an intersection during repeated cycling of the transition cover between a relaxed condition and a stretched condition. An area of stress relief reduces the probability of rupture of the skin or wall of a molded transition cover if rough handling of the cable transition section occurs during manufacturing and installation or when use of the cable structure includes repeated flexing and structural distortion.

The need for an area of stress relief, in articles subject to continuous or repeated flexure, while readily appreciated, presents a challenge for designing a mold that provides a molded part having the desired stress relief acting between the cable receiving tube or stem of a cable transition cover and the branch covers or wire cover sleeves that extend from the stem. The capability for molding stress relieving, cable transition covers according to the present invention distinguishes them from prior covers that exhibited fatigue and splitting by rupture of elastomeric material under stress. A further distinguishing feature of the present invention is the discovery that stress relieving pockets, suitably placed adjacent to the intersections of the stem and branches of a cable transition cover, allow the production of protected cable transition sections having reduced bulk compared to prior similar transition sections. A cable transition having reduced bulk requires less space for its containment. Space for containing wire harnesses and the like may, therefore, be used more efficiently when employing cable transition covers according to the present invention.

Figure 1:
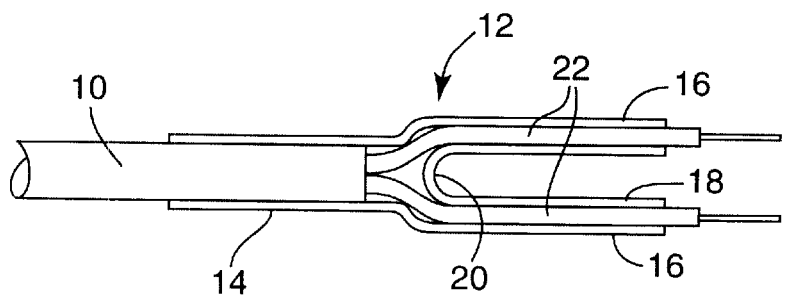
FIG. 1 shows a cross section of a cable transition protected by a conventional cable transition cover.

Referring now to the figures wherein like numbers identify like parts throughout the several views, FIG. 1 provides a cross-section showing an electrical cable 10 that contains multiple wires that may be sorted and separately protected using an insulating sleeve. An article for cable and wire protection is referred to herein as a cable transition cover 12. A cable transition cover 12 includes a cable receiving tube 14 and at least two wire cover sleeves 16. The cable transition cover 12 includes a wall 18 between wire cover sleeves 16. A bend 20 in the wall 18 acts as a retainer to keep individual wires 22 apart. Installation of a cable 10 into a cable transition cover 12, for separate protection of individual wires 22 using wire cover sleeves 16,may be accomplished using known means. Suitable means include manual insertion of cable 10 and wires 22 or pre-stretching the cable transition cover 12 to provide a recoverable article or the like. A suitable recoverable article has tubular openings radially sized for easy insertion of the cable 10 and the wires 22 before shrinking the stretched cable transition cover 12 to provide a seal and protective cover. Pre-stretched, recoverable articles, commonly referred to as a cold-shrink covers or tubes, are well known in applications requiring insulation and protection of electrical cables and wires.

Figure 2:
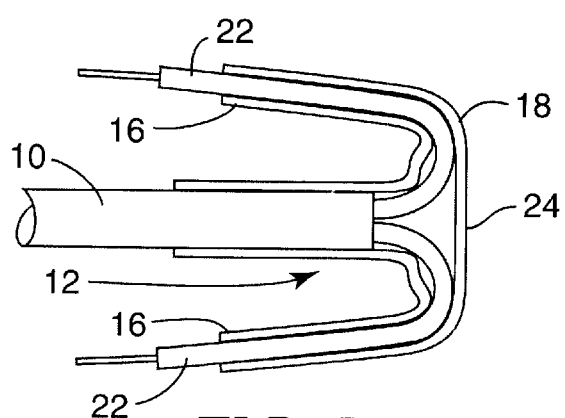
FIG. 2 is a cross section including a cable transition and a conventional cable transition cover placed under stress by severely bending wire cover sleeves through an angle of approximately 180°.

FIG. 2 provides a cross section of a cable transition cover 12 placed under stress by bending both of the wire cover sleeves 16 through an angle of approximately 180°. In this condition the bend portion 20 becomes a stretched portion 24. Most of the stress associated with bending the wire cover sleeves 16 concentrates in the stretched portion 24. Using the cable transition cover 12 design shown in FIG. 1 and FIG. 2 there is a high probability that stress concentration in the stretched portion 24 will exceed the tensile strength of the wall 18 with resultant rupture of the wall 18 at that point. Without changes in the design of the cable transition cover 12, excessive bending during cable installation could lead to failure, at times catastrophic, that prevents suitable sealing and protection of an underlying cable transition region.

Figure 3:
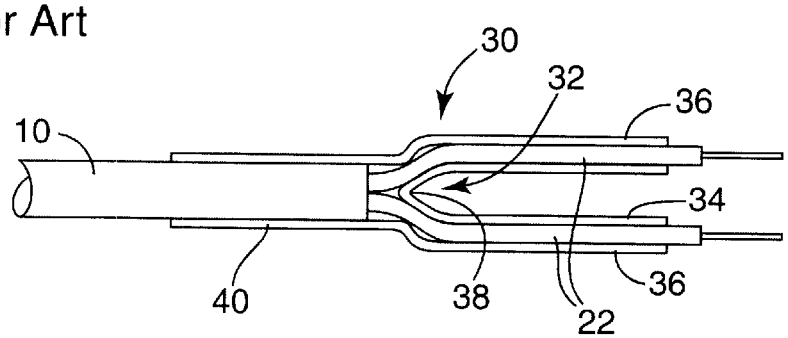
FIG. 3 shows a cross section of a cable transition protected by a cable transition cover according to the present invention, including a stress relief pocket.

Cable transition covers 30 according to the present invention overcome the problem of wall rupture by changing the structure of the bend 32 included in the wall 34 between wire cover sleeves 36. FIG. 3 shows a cross sectional view of a cable transition cover 30 according to the present invention in which the bend 32 includes a pocket 38 extending towards the cable receiving tube 40.

Figure 4:
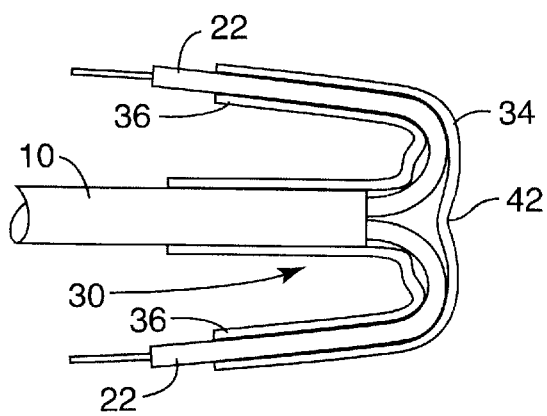
FIG. 4 is a cross section including a cable transition and a cable transition cover according to the present invention placed under stress by severely bending wire cover sleeves through an angle of approximately 180°.

FIG. 4 shows, in cross section, that the pocket 38 allows severe bending of the wire cover sleeves 36 without the same amount of stretching as that applied to the stretched portion 24 illustrated in FIG. 2. Instead, the bend 32 and intervening pocket 38 provide an extended portion 42 under a stress that is less than the tensile strength of the cable transition cover 30 material.

Figure 5:
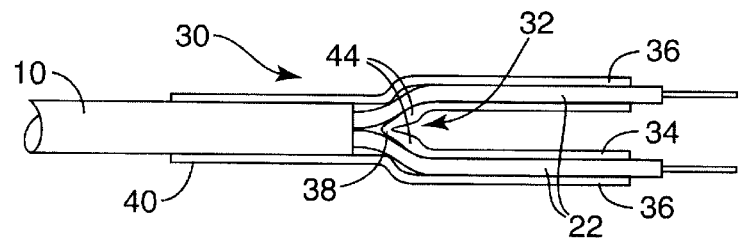
FIG. 5 shows a cross section of a cable transition protected by an alternate embodiment of a cable transition cover according to the present invention, including a stress relief pocket.
Figure 6:
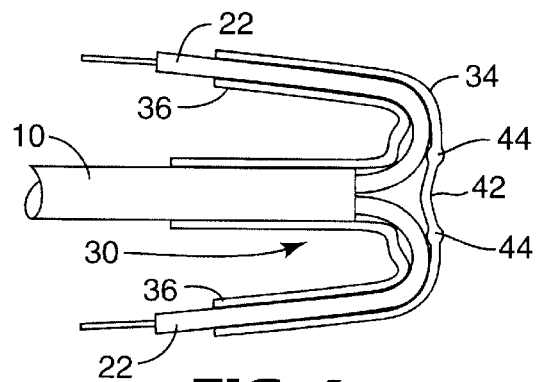
FIG. 6 is a cross section including a cable transition and the cable transition cover illustrated in FIG. 5 placed under stress by severely bending wire cover sleeves through an angle of approximately 180°.

FIG. 5 provides a modified embodiment of a cable transition cover 30 of the present invention in which the bend 32 includes thickened sections 44. This embodiment when placed under stress as shown in FIG. 6 provides further protection against wall 34 rupture due to the presence of the pocket 38 and the thickened sections 44, which are expected to reinforce the extended portion 42.

Figure 7:
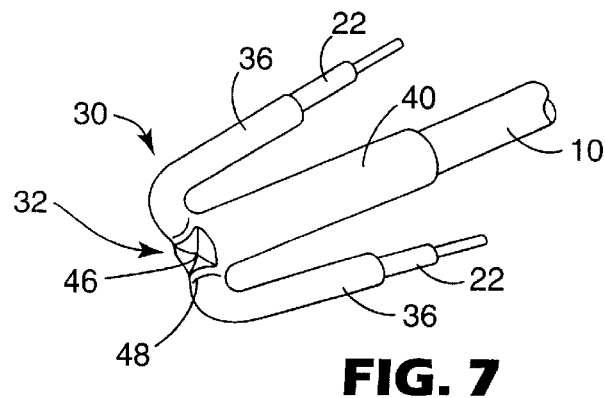
FIG. 7 is a perspective view of a cable transition cover according to the present invention including a stress relief pocket at the intersection of a cable receiving tube and two wire cover sleeves.

FIG. 7 provides a perspective view of a cable transition according to the present invention, showing each of the wire cover sleeves 36 bent backwards towards the cable receiving tube 40. As illustrated, the structure of the bend area is visible showing a stress relief pocket 46 as a partially folded or cupped area between a pair of reinforcing ribs 48 resulting from wall thickening as described previously.

Figure 8:
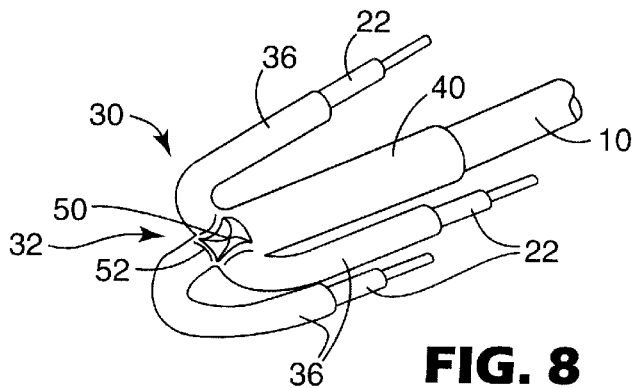
FIG. 8 is a perspective view of a cable transition cover according to the present invention including a stress relief pocket at the intersection of a cable receiving tube and three wire cover sleeves.

FIG. 8 is a perspective view of the present invention showing that a cable transition cover according to the present invention may include more than two wire cover sleeves 36. As illustrated, upon bending each wire cover sleeve 36 through an angle of approximately 180°, the bend region 32 is seen to include a stress relief pocket 50 as a partially folded or cupped area between three ribs 52 that provide additional reinforcement when the bend region 32 includes thickened portions.

Materials that may be molded into cable transition covers according to the present invention are typically highly elastomeric polymers, including both vulcanized elastomers and thermoplastic elastomers (TPE), having a Shore A scale hardness up to about 100. There is a substantially linear relationship between tensile modulus (defined in Rubber Industry terms as "Modulus of the Rubber") and elongation. The slope of a plot of tensile vs elongation produces a line representing Young's modulus (E). E is approximately 3G, where G is the shear modulus of the material, which has an approximately linear relationship with Shore A hardness. Preferred values of G for elastomeric materials range from about 0.2 MN/sq meter to 5 MN/sq meter. This translates to a Shear modulus range of about 0.2 MN/sq meter (29 psi) to about 5 MN/sq meter (725 psi) or a Young's Modulus of about 0.6 MN/sq meter (87 psi) to about 15 MN/sq meter (2175 psi). Using a linear interpretation on these criteria gives a 100% rubber modulus value between about 0.6 MN/sq meter (87 psi) to about 15 MN/sq meter (2175 psi) and a 300% modulus range of about 1.8 MN/sq meter (261 psi) to about 45 MN/sq meter (6525 psi).

Preferred materials exhibit rupture-free elongation of 100% by application of forces between about 0.62 MN/sq meter (90 psi) to about 1.77 MN/sq meter (257 psi) and rupturefree elongation of 300% by application of between about 2.34 MN/sq meter (340 psi) to about 6.5 MN/sq meter (1000 psi). Suitable polymers further exhibit elongation between about 450% and about 850%. Useful polymers for molding cable transition covers according to the present invention include ethylene propylene diene monomer (EPDM) rubbers, silicone elastomers, fluorosilicone elastomers, fluoro-elastomers, and others in the category of vulcanized elastomers and thermoplastic elastomers.

Protective structures produced using elastomers as described previously have been placed in a pre-stretched condition using disposable cores, shaped as cylindrical tubes, placed inside openings in the protective structures. Depending upon the complexity of the shape of a protective structure, it may not be possible to retain a pre-stretched condition due to material fatigue, which leads to rupture of the elastomer film at points where stretching stress concentrates. Cable transition covers according to the present invention that include stress relief zones, such as stress relief pockets or folds or cups or the like, allow pre-stretching of structures of increased complexity without rupture of the elastomeric skin. For example, attempts to pre-stretch an elastomeric cover comprising a cable receiving tube separating into three or more wire cover sleeves were relatively unsuccessful. Using cable transition covers according to the present invention a cable receiving tube intersecting with at least three wire cover sleeves may be stretched for insertion of a support core into each of the tube and sleeve sections without rupture of the elastomeric film or skin in the region of the intersection, where stretching stress is expected to concentrate.

As required, details of the present invention are disclosed herein; however, it is to be understood that the disclosed embodiments of cable transition covers according to the present invention are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A molded article for protecting a transition section of a multi-wire cable, said article comprising:

a transition cover comprising an elastomeric skin, said transition cover further comprising a cable receiving tube;

three or more wire cover sleeves each having an intersection with said cable receiving tube to provide a passage from said cable receiving tube to each of said three or more wire cover sleeves for insertion of at least one wire of the multi-win cable; and a stress relief portion formed in said elastomeric skin adjacent to at least a portion of each said intersection, said stress relief portion reducing the concentration of stress at each said intersection during movement of said transition cover from a relaxed condition to a stretched condition.

2. The molded article of claim 1, wherein said stress relief portion is a stress relief pocket extending towards said cable receiving tube.

3. The molded article of claim 2, wherein said stress relief pocket further includes at least one crease to accommodate expansion of said stress relief pocket from a partially folded condition thereby reducing the concentration of stress at each said intersection during movement of said transition cover from a relaxed condition to a stretched condition.

4. The molded article of claim 1, wherein said elastomeric skin has a Young's Modulus from about 0.6 MN/sq meter (87 psi) to about 15 MN/sq meter (2175 psi).

5. The molded article of claim 1, wherein said elastomeric skin has a 300% modulus from about 1.8 MN/sq meter (261 psi) to about 45 MN/sq meter (6525 psi).

6. The molded article of claim 1, wherein said elastomeric skin has an elongation from about 450% to about 850%.

7. The molded article of claim 1, wherein said elastomeric skin comprises a material selected from the group consisting of vulcanized elastomers and thermoplastic elastomers.

8. The molded article claim 7, wherein said elastomeric skin comprises a material selected from the group consisting of ethylene propylene diene monomer (EPDM) terpolymers, silicone elastomers, fluorosilicone elastomers, and fluoroelastomers.

9. A covered cable transition section comprising:
  a cable including a plurality of wires;
  a plurality of branch wire sections formed by selective separation of said plurality of wires; and
  a transition cover comprising an elastomeric skin, said transition cover further comprising:
    a cable receiving tube for receiving said cable;
    three or more wire cover sleeves each having an intersection with said cable receiving tube to provide a passage from said cable receiving tube to each of said tree or more wire cover sleeves for insertion of at least one of said branch wire sections of said cable; and
    a stress relief portion formed in said elastomeric skin adjacent to at least a portion of each said intersection, said stress relief portion reducing the concentration of stress at each said intersection during movement of said transition cover from a relaxed condition to a stretched condition.

10. The covered cable transition section of claim 9, wherein said stress relief portion is a stress relief pocket extending towards said cable receiving tube.

11. The covered cable transition section of claim 10, wherein said stress relief pocket further includes at least one crease to accommodate expansion of said stress relief pocket from a partially folded condition thereby reducing the concentration of stress at each said intersection during movement of said transition cover from a relaxed condition to a stretched condition.

12. The covered cable transition section of claim 9, wherein said elastomeric skin has a Young's Modulus from about 0.6 MN/sq meter (87 psi) to about 15 MN/sq meter (2175 psi).

13. The covered cable transition section of claim 9, wherein said elastomeric skin has a 300% modulus from about 1.8 MN/sq meter (261 psi)to about 45 MN/sq meter (6525 psi).

14. The covered cable transition section of claim 9 wherein said elastomeric skin has an elongation from about 450% to about 850%.

15. The covered cable transition section of claim 9, wherein said elastomeric skin comprises a material selected from the group consisting of vulcanized elastomers and thermoplastic elastomers.

* * * * *

UNITED STATES PATENT AND TRADEMARK OFFICE
CERTIFICATE OF CORRECTION

PATENT NO.    : 6,576,841 B1
DATED         : June 10, 2003
INVENTOR(S)   : Brannan, Dennis G.

It is certified that error appears in the above-identified patent and that said Letters Patent is hereby corrected as shown below:

Title page,
Item "[73] Assignee: Office of Intellectual Property Counsel 3M Innovative Properties Company, St. Paul, MN (US)" should read -- [73] Assignee: 3M Innovative Properties Company, St. Paul, MN (US) --

Column 8,
Line 2, "tree" should read -- three --.

Signed and Sealed this

Twenty-sixth Day of August, 2003

JAMES E. ROGAN
*Director of the United States Patent and Trademark Office*